United States Patent [19]

Yamada et al.

[11] Patent Number: 4,602,254

[45] Date of Patent: Jul. 22, 1986

[54] PAGING RECEIVER WHICH IS RESETTABLE WITH EXTERNAL-NOISE DETECTOR

[75] Inventors: Kazumori Yamada; Masaaki Akahori, both of Tokyo, Japan

[73] Assignee: NEC Corporation, Tokyo, Japan

[21] Appl. No.: 582,175

[22] Filed: Feb. 21, 1984

[30] Foreign Application Priority Data

Feb. 25, 1983 [JP] Japan .................................. 58-29284

[51] Int. Cl.⁴ ............................................... G08B 5/22
[52] U.S. Cl. ........................... 340/825.48; 340/825.44; 340/311.1
[58] Field of Search ...................... 328/165; 330/149; 445/212, 218, 222–225, 238, 213; 340/825.44, 825.45, 825.46, 825.47, 825.48, 311.1; 377/30, 31, 107; 371/64; 375/99, 102, 104; 179/2 EC; 307/542, 572, 162, 163

[56] References Cited

U.S. PATENT DOCUMENTS

| | | | |
|---|---|---|---|
| 3,602,820 | 8/1971 | Kaufman | 455/213 X |
| 3,818,358 | 6/1974 | Russell | 377/107 X |
| 4,063,180 | 12/1977 | Norman | 375/104 X |
| 4,112,371 | 9/1978 | Ogita | 455/222 X |
| 4,288,753 | 9/1981 | Babano | 455/223 X |
| 4,323,881 | 4/1982 | Mori | 340/825.48 |

*Primary Examiner*—Ulysses Weldon
*Attorney, Agent, or Firm*—Laff, Whitesel, Conte & Saret

[57] ABSTRACT

A paging receiver includes a noise detector for detecting an external noise component applied to a housing of the paging receiver, and a reset circuit having a timer which is started in response to an output from the noise detector and which generates a reset pulse to reset other components of the paging receiver in the initial standby state.

14 Claims, 5 Drawing Figures

PAGING RECEIVER WHICH IS RESETTABLE WITH EXTERNAL-NOISE DETECTOR

BACKGROUND OF THE INVENTION

I. Field of the Invention

The present invention relates to a paging receiver used in a paging communication system.

II. Description of the Prior Art

Conventional paging receivers frequently adopt a tone generating system wherein a code corresponding to a predetermined identification (ID) number is stored in a memory, a coincidence between a received and decoded code and the code read out from the memory is detected, and an audible tone is produced in response to detection of this coincidence to indicate to a desired receiver-holder that he is being paged. A typical example of the newly developed paging receivers adopting this system is a "RADIO PAGER WITH REDUCED POWER CONSUMPTION" in U.S. Pat. No. 4,323,881 of the same applicant issued Apr. 6, 1982. This pager comprises: a receiver circuit for receiving a carrier wave modulated with a predetermined tone signal as a digit of an ID number given to the pager and demodulating the carrier wave to produce the tone signal; a read-only memory (ROM) for storing codes each associated with a corresponding tone signal constituting a digit of the ID number; a readout circuit for sequentially reading out the codes from the ROM; a hold circuit for holding the codes read out from the ROM; a first decoder for decoding any one of the codes read out from the ROM; a variable band-pass filter responsive to a decoded output from the fist decoder to selectively pass the corresponding tone signal demodulated by the receiver circuit; a tone detector for detecting the modulated tone signal passed through the variable band-pass filter; and a second decoder for decoding an output from the tone detector and causing the readout circuit to read out the code from the ROM. In this pager, the read time of the ROM can be decreased by the readout circuit and the hold circuit, thereby decreasing power consumption of the ROM and hence resulting in an advantage.

However, in the pager or paging receiver of the type described above, when the hold circuit comprising low-power consumption elements such as CMOSs is used to hold the code read out from the ROM, the CMOS tends to be influenced by an induced noise component. Therefore, the readout data from the ROM is altered by a pulsed electrostatic noise component. As a result, the pager having the predetermined ID number cannot be paged. In order to eliminate this problem, the power switch must first be turned off and then be turned on, thus resulting in inconvenience.

SUMMARY OF THE INVENTION

It is, therefore, an object of the present invention to provide a paging receiver wherein an external noise component, when it is received, is used to automatically cancel a code read out from a ROM and reset the paging receiver to be an initial standby mode.

In order to achieve the above object of the present invention, there is provided a paging receiver including memory means for storing codes corresponding to an identification number of the paging receiver, readout means for reading out any one of the codes from the memory means, temporary storage means for temporarily storing the code read out from the memory means, and selective detecting means for selectively detecting a tone signal when the tone signal coincides with the code stored in the temporary storing means, an output from the selective detecting means being used to operate the readout means, characterized in that an input terminal of noise detecting means is connected to a housing of the paging receiver or a conductor so as to generate a pulse from an output terminal thereof when an external electrical noise component is applied to the paging receiver, the selective detecting means is connected to one input terminal of an OR gate, the readout means is connected to an output terminal of the OR gate, and the output terminal of the noise detecting means is connected to the other input terminal of the OR gate.

According to the noise detecting means of the present invention, the external noise component applied to the housing of the paging receiver is detected to reset the internal circuit components of the paging receiver, thereby preventing malfunction and resetting the paging receiver in the initial standby state.

BRIEF DESCRIPTION OF THE DRAWINGS

FIG. 4b is a timing chart of input and output signals of the equivalent circuit shown in FIG. 4a.

DETAILED DESCRIPTION OF THE PREFERRED EMBODIMENT

A paging receiver according to an embodiment of the present invention will be described with reference to the accompanying drawings.

Figure 1:
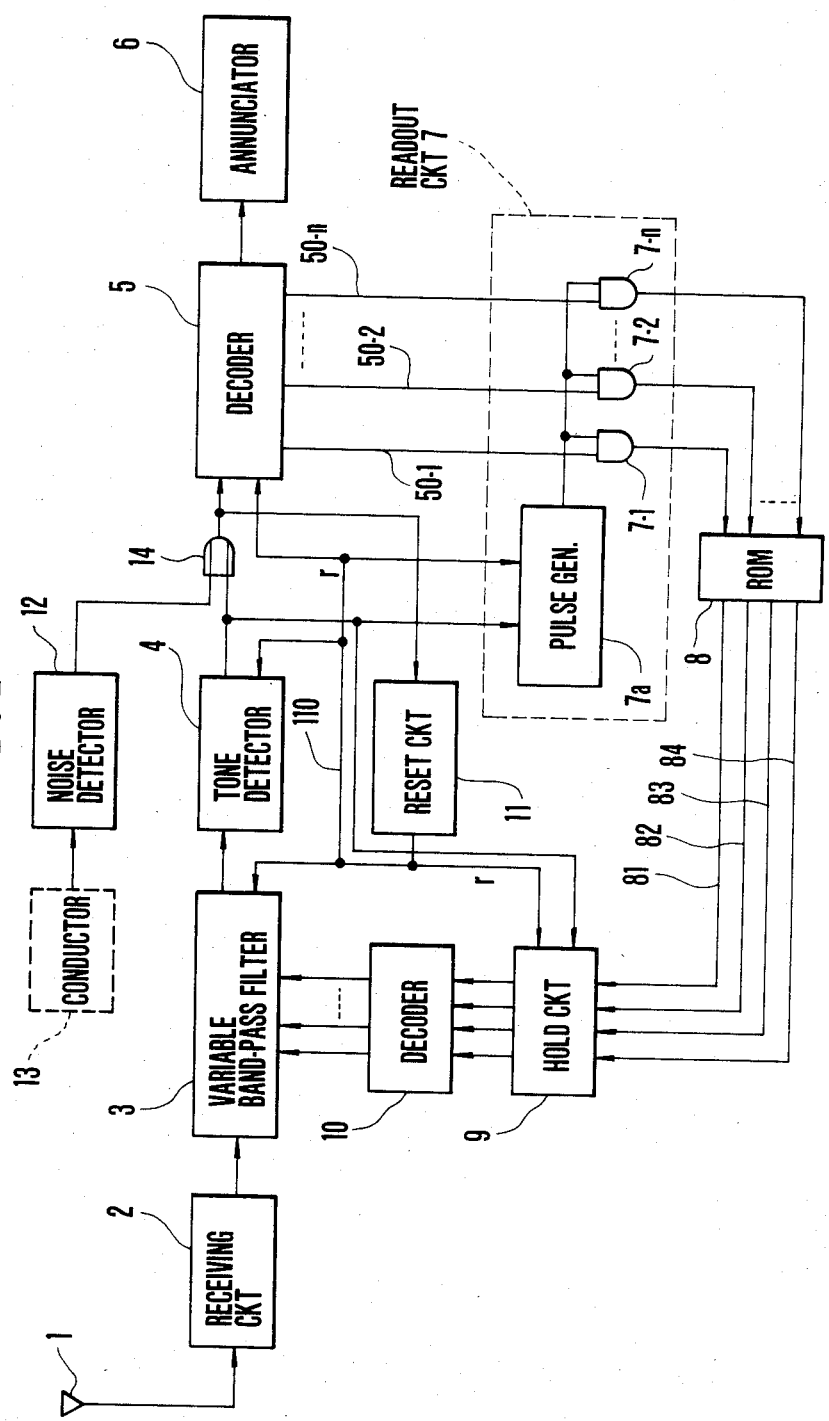
FIG. 1 is a block diagram of a paging receiver according to an embodiment of the present invention.

FIG. 1 is a block diagram of the paging receiver according to the embodiment of the present invention. Referring to FIG. 1, an antenna 1 is connected to a receiving circuit 2 which demodulates a carrier wave to produce tone signals. A variable band-pass filter 3 is connected to the output terminal of the receiving circuit 2 to filter a tone signal having a predetermined frequency. A tone detector 4 is connected to the output terminal of the variable band-pass filter 3 to detect the tone signal passing through the variable band-pass filter 3. A decoder 5 is connected to the output terminals of the tone detector 4 and a noise detector 12, respectively, through an OR gate 14. The decoder 5 is connected to an input terminal of a readout circuit 7 to supply an output thereto. An output from the decoder 5 is supplied to an annunciator 6. A read-only memory (ROM) 8 stores codes which constitute the ID number of the paging receiver. A hold circuit (temporary storing means) 9 connected between the ROM 8 and a decoder 10 temporarily stores a code read out from the ROM 8. The decoder 10 is connected to other input terminals of the variable band-pass filter 3 to set the center frequency of the filter 3 to be a predetermined value so as to pass the corresponding tone signal. The input terminal of a reset circuit 11 is connected to the output terminal of the OR gate 14, and the output terminal thereof is connected to the decoder 5, the tone detector 4, the variable band-pass filter 3, the hold circuit 9, and a pulse generator 7a of the readout circuit 7. The input terminal of the noise detector 12 is connected to a conductor 13 such as a housing of the paging receiver.

Figure 2:
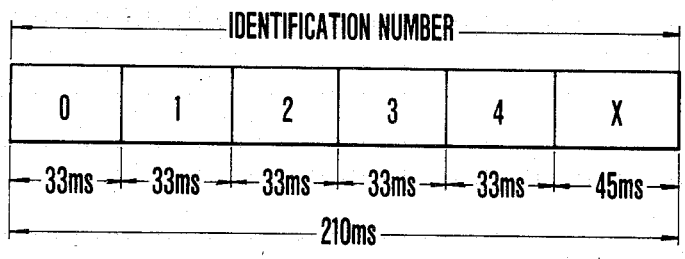
FIG. 2 shows a signal format of tone signals corresponding to an ID number of the paging receiver shown in FIG. 1.

In operation, when the power switch of the paging receiver is turned on, the reset circuit 11 generates a reset pulse r which appears on a control line 110. The reset pulse r which appears on a control line 110. The reset pulse r is supplied to the filter 3, the tone detector 4, the decoder 5 and the hold circuit 9 which are then reset in the initial state. A decoded output from the decoder 5 is supplied to an AND gate 7-1 of the readout circuit 7 through a lead wire 50-1. When the pulse generator 7a supplies a pulse to the AND gate 7-1, the decoded signal is gated through the AND gate 7-1 and is supplied as an address signal to the ROM 8. A code "HHHH" corresponding to a first digit symbol "0" (i.e., a tone signal having a frequency of 600 Hz) of the ID number shown in FIG. 2 is read out from a memory area at the first address of the ROM 8. The relationship between the digit symbols, the tone signal frequencies and the codes stored in the ROM are summarized in Table 1.

TABLE 1

| symbol | Frequency (Hz) | $2^3$ | $2^2$ | $2^1$ | $2^0$ |
|---|---|---|---|---|---|
| R | 459 | L | H | L | H |
| 0 | 600 | H | H | H | H |
| 1 | 741 | H | H | H | L |
| 2 | 882 | H | H | L | H |
| 3 | 1023 | H | H | L | L |
| 4 | 1164 | H | L | H | H |
| 5 | 1305 | H | L | H | L |
| 6 | 1446 | H | L | L | H |
| 7 | 1587 | H | L | L | L |
| 8 | 1728 | L | H | H | H |
| 9 | 1869 | L | H | H | L |
| X | 2010 | L | L | H | H |

The code "HHHH" read out from the ROM 8 is supplied to the hold circuit 9 such that four code pulses are respectively supplied through lead wires 81 to 84. The four code pulses supplied through the lead wires 81 to are written in four flip-flops of the hold circuit 9, respectively. The stored data is supplied to the decoder 10 in units of pulses. The decoder 10 sets the center frequency of the variable band-pass filter 3 to be 600 Hz (Table 1) which corresponds to the code "HHHH". The paging receiver is then set in the standby mode wherein a tone signal having a frequency 600 Hz can be received. However, in this standby mode, when the 600 Hz tone signal corresponding to the digit symbol "0" of the ID number is not received within αmsec, a timer built in the reset circuit 11 has elapsed, so that the reset circuit 11 generates a reset pulse r. The reset pulse r is supplied through the control line 110 to the filter 3, the tone detector 4, the decoder 5 and the flip-flops of the hold circuit 9. These components are then reset in response to the reset pulse r. At the same time, the pulse generator 7a is reset in response to the reset pulse r and generates a pulse of level "H" having a pulse width of βmsec. The "H" level pulse is used as the address pulse to read out the code "HHHH" from the memory area at the first address of the ROM 8. The code pulses of H level are respectively written in the flip-flops, so that the decoder 10 sets the center frequency of the variable band-pass filter 3 to be 600 Hz.

In the standby mode described above, when the tone signal having the frequency of 600 Hz which corresponds to the code "HHHH" is received in the receiving circuit 2 through the antenna 1, the tone signal passes through the filter 3 and is detected by the tone detector 4. The detected tone signal is supplied to the decoder 5. When this pulse is received by the decoder 5, the decoder 5 detects that the proper tone has been received by the paging receiver and decodes the code corresponding to the second digit symbol ("1" in the signal format shown in FIG. 2) of the ID number. The output of high level from the decoder 5 is supplied to the readout circuit 7 through a lead wire 50-2 and an AND gate 7-2, so that the code "HHHL" is read out from the ROM 8. This readout code is stored in the hold circuit 9 and is decoded by the decoder 10. An output from the decoder 10 is supplied to the filter 3 so as to set the center frequency of the filter 3 to be 741 Hz. Therefore, the variable band-pass filter 3 is set in the standby mode where only the 741 Hz tone signal (digit symbol "1") can be filtered therethrough. Finally, when a series of digit symbols 0, 1, 2, 3 and 4 (corresponding to the ID number 01234) or digit symbols 0, 1, 2, 3, 4 and X (wherein the presence of symbol X indicates a different paged state) are detected, the decoder 5 supplies different outputs respectively corresponding to the ID numbers to the annunciator 6 so as to indicate that the receiver-holder is differently paged. At the same time, the decoder 5 supplies an "H" level pulse to the AND gate 7-1 through the lead wire 50-1 to set the paging receiver in the initial standby mode which is the same state as in initial power-on state. The paging receiver thus prepares for the subsequent tone signal reception.

The above operation described with reference to FIG. 1 is the same as that of the conventional paging receiver. In the tone signal standby mode or during reception of the tone signals, when an external electrical noise component such as a pulsed noise component due to electrostatic induction is applied to the housing of the paging receiver, an impulse wave changes the contents of the hold circuit 9 which are read out from the ROM. In this manner, when the contents of the hold circuit 9 change, the rewritten code cannot coincide with the corresponding tone signal. As a result, the ID number cannot be identified. In order to solve this problem according to the embodiment described with reference to FIG. 1, the noise detector 12 is connected to the OR gate 14 inserted between the tone detector 4 and the decoder 5. When an external noise is applied to the conductor 13 such as the housing of the paging receiver, the noise detector 12 detects the external noise and supplies an output to the reset circuit 11 through the OR gate 14. The timer of the reset circuit 11 is then started in response to the output from the external noise detector 12. The timer then generates the reset signal r to erase the erroneous contents of the hold circuit 9 which would be affected by the noise and to reset the variable band-pass filter 3, the tone detector 4, the decoder 5 and the pulse generator 7a. As a result, the paging receiver can be reset in the initial standby state.

Figure 3:
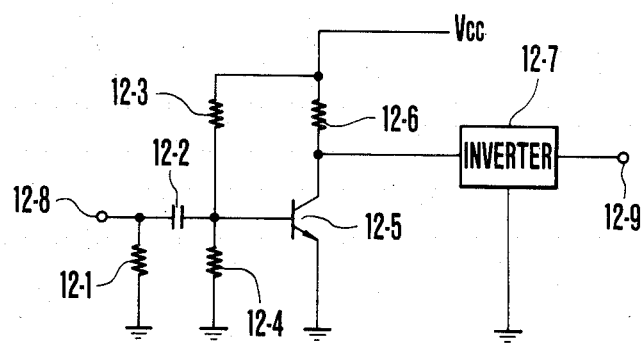
FIG. 3 is a circuit diagram of a noise detector of the paging receiver shown in FIG. 1.

FIG. 3 is a circuit diagram of the noise detector 12 of the paging receiver shown in FIG. 1. One end of an input load resistor 12-1 connected to an input terminal 12-8 of the noise detector 12, and the other end thereof is grounded. A series circuit of bias resistors 12-3 and 12-4 is connected between a power supply voltage $V_{CC}$ and a ground potential. A capacitor 12-2 is connected to the one end of the input load resistor 12-1 and the common node between the bias resistors 12-3 and 12-4. The base of an npn transistor 12-5 is connected to this common node, and the collector thereof is connected to the power supply voltage $V_{CC}$ through a collector load resistor 12-6 and to an output terminal 12-9 through a inverter 12-7 which is grounded. The emitter of the transistor 12-5 is grounded.

A collector current $i_C$ of the transistor 12-5 is given by the following equations:

$$i_C = h_{FE} \cdot i_B \quad (1)$$

$$i_C = V_{CE}/R_C + V_{CC}/R_C \quad (2)$$

where $h_{FE}$ is the amplification factor,
$i_B$ is the base current of the transistor 12-5,
$R_C$ is the resistance of the resistor 12-6,
$V_{CE}$ is the collector-emitter voltage of the transistor 12-5, and
$V_{CC}$ is the power supply voltage.

A collector current $i_{CQ}$ with respect to the collector-emitter voltage $V_{CEQ}$ at a switching operating point Q of the transistor 12-5 is obtained from equation (1) above as follows:

$$i_{CQ} = h_{FE} \cdot i_B \quad (3)$$

so that the base current $i_B$ is obtained from equation (3) as follows:

$$i_B = i_{CQ}/h_{FE} \quad (4)$$

Therefore, the base current $i_B$ is given as follows in accordance with equation (4) and the circuit shown in FIG. 3:

$$i_B = [\{R_2/(R_1+R_2)\} \cdot V_{CC} - V_{BE}]/\{R_1 R_2/(R_1+R_2)\} \quad (5)$$

where $V_{BE}$ is the base-emitter voltage of the transistor 12-5,
$R_1$ is the resistance of the resistor 12-3, and
$R_2$ is the resistance of the resistor 12-4.

According to equation (5), the resistances $R_1$ and $R_2$ are given by:

$$R_1 = (R_2 V_{CC} - R_2 V_{BE})/(R_2 i_B + V_{BE}) \quad (6)$$

$$R_2 = R_1 V_{BE}/(V_{CC} - V_{BE} - R_1 i_B) \quad (7)$$

Figure 4A:
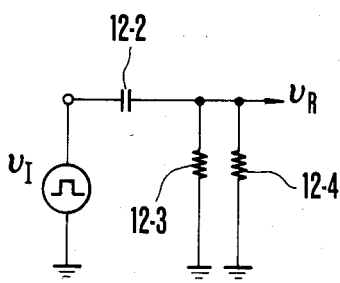
FIG. 4a is a circuit diagram of an equivalent circuit of a differentiation function of an input stage of the noise detector shown in FIG. 3.

The resistances $R_1$ and $R_2$ are thus determined, and the operating point Q of the transistor 12-5 is set. The input stage of the noise detector comprises a differentiator stage for differentiating an input noise component to a sharp impulse wave, as shown in FIG. 4a.

Figure 4B:
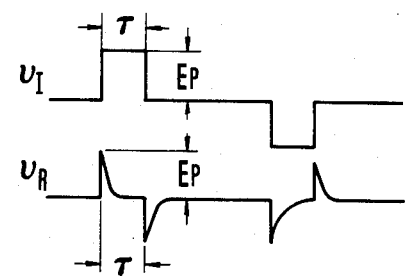

When a rectangular input signal $V_I$ is applied between the capacitor 12-2 and ground, a differentiated output signal $V_R$ appears as shown in the waveform (FIG. 4b) in accordance with a time constant which is determined by a capacitance $C_1$ of the capacitor 12-2 and by a resistance $R_1 R_2/R_1 + R_2$ of the resistors 12-3 and 12-4. The output signal $V_R$ is applied as a differential wave having peak values $+E_p$ and $-E_p$ to the base of the transistor 12-5 respectively at the leading edge and the trailing edge of the input signal $V_I$ having a pulse width $\tau$. The leading pulse causes the transistor 12-5 to operate such that the collector voltage is set to be negative and the output terminal of the inverter 12-7 is biased to be positive. When the housing of the paging receiver is used as the conductor 13 connected to the input terminal 12-8, the housing is grounded and is short-circuited in a direct current manner. However, a potential difference appears between the terminal 12-8 and ground due to a loop impedance against the electrostatically or electromagnetically induced impulse.

In the above embodiment, the housing of the paging receiver is used as the conductor 13. However, a separate conductor may be arranged in the housing.

Furthermore, in the above embodiment, the present invention is exemplified by the paging receiver having a tone signal decoder. However, the present invention can also be applied to a paging receiver having a digital decoder.

The present invention is not limited to the particular embodiment. Various changes and modifications may be made within the spirit and scope of the present invention.

What is claimed is:

1. A paging receiver for responding to a receipt of encoded tone radio signals, said receiver comprising:
    memory means for storing codes corresponding to an identification number of said paging receiver;
    readout means for reading out any one of the codes from said memory means;
    holding means responsive to said readout means for temporarily storing the code read out from said memory means;
    selecting and detecting means for selectively detecting a received one of said encoded tone signals when the code of the tone signal coincides with the code stored in said holding means;
    external noise detecting means for detecting an external noise component which alters the holding state of said holding means; and
    resetting means for resetting said readout means, said holding means and said selecting and detecting means in response to an output from said external noise detecting means.

2. A receiver according to claim 1, wherein said external noise detecting means comprises a noise detector and a conductor connected to an input terminal thereof.

3. A receiver according to claim 2, wherein said conductor comprises a housing of said paging receiver.

4. A receiver according to claim 2, wherein said conductor comprises a conductive element arranged in said paging receiver.

5. A receiver according to claim 1, wherein said readout means comprises a pulse generator for generating a pulse in response to a reset pulse from said resetting means, and a plurality of AND gates for respectively gating address signals to said memory means.

6. A receiver according to claim 1, wherein said memory means comprises a read-only memory.

7. A receiver according to claim 1, wherein said holding means comprises a plurality of flip-flops.

8. A receiver according to claim 1, wherein said selecting and detecting means comprises:
    a variable band-pass filter for passing the tone signal having a predetermined frequency;
    a tone detector for detecting an output from said variable band-pass filter;
    a first decoder, connected between said holding means and said variable band-pass filter, for setting a center frequency of said variable band-pass filter to pass the tone signal having the predetermined frequency;
    a second decoder, connected to said readout means, for causing said readout means to read out the code associated with the tone signal; and an OR gate having one input terminal connected to said tone detector, the other input terminal connected to an output terminal of said noise detector, and an output terminal connected to said second decoder and to said resulting means.

9. A receiver according to claim 2, wherein said selecting and detecting means comprises:
a variable band-pass filter for passing the tone signal having a predetermined frequency;
a tone detector for detecting an output from said variable band-pass filter;
a first decoder, connected between said holding means and said variable band-pass filter, for setting a center frequency of said variable band-pass filter to pass the tone signal having the predetermined frequency;
a second decoder, connected to said readout means, for causing said readout means to read out the code associated with the tone signal; and
an OR gate having one input terminal connected to said tone detector, the other input terminal connected to an output terminal of said noise detector, and an output terminal connected to said second decoder and to said resulting means.

10. A receiver according to claim 1, wherein said resetting means includes a timer which is started in response to an output from said noise detector and which generates the reset pulse to reset said selecting and detecting means, said holding means and said pulse generator.

11. A receiver according to claim 5, wherein said resetting means includes a timer which is started in response to an output from said noise detector and which generates the reset pulse to reset said selecting and detecting means, said holding means and said pulse generator.

12. A paging receiver comprising:
memory means for storing codes corresponding to an identification number of said paging receiver;
readout means for reading out any one of the codes from said memory means;
holding means responsive to said readout means for temporarily storing the code read out from said memory means;
selecting and detecting means for selectively detecting a tone signal when the tone signal coincides with the code stored in said holding means;
external noise detecting means for detecting an external noise component which alters the holding state of said holding means, said external noise detecting means comprising a noise detector and a conductor connected to an input terminal thereof;
a differentiator circuit having first and second biasing resistors connected in series with each other between a power supply voltage and ground, and a capacitor connected between said input terminal of said noise detector and a common node between said first and second bias resistors;
an input load resistor connected between said input terminal of said noise detector and ground;
a collector load resistor connected to the power supply voltage;
a transistor having a collector connected through said collector load resistor to the power supply voltage, a base connected to said common node between said first and second bias resistors, and an emitter which is grounded;
an inverter which is connected between an output terminal of said noise detector and said collector of said transistor, and which is grounded; and
resetting means for resetting said readout means, said holding means and said selecting and detecting means in response to an output from said external noise detecting means.

13. A receiver according to claim 12, wherein said selecting and detecting means comprises:
a variable band-pass filter for passing the tone signal having a predetermined frequency;
a tone detector for detecting an output from said variable band-pass filter;
a first decoder, connected between said holding means and said variable band-pass filter, for setting a center frequency of said variable band-pass filter to pass the tone signal having the predetermined frequency;
a second decoder, connected to said readout means, for causing said readout means to read out the code associated with the tone signal; and
an OR gate having one input terminal connected to said tone detector, the other input terminal connected to an output terminal of said noise detector, and an output terminal connected to said second decoder and to said resulting means.

14. A receiver according to claim 12, wherein said resetting means includes a timer which is started in response to an output from said noise detector and which generates the reset pulse to reset said selecting and detecting means, said holding means and said pulse generator.

* * * * *